(12) United States Patent
Krall et al.

(10) Patent No.: US 9,298,021 B2
(45) Date of Patent: Mar. 29, 2016

(54) METHODS AND LENSES FOR ALLEVIATING ASTHENOPIA

(71) Applicant: eyeBrain Medical, Inc., San Diego, CA (US)

(72) Inventors: Jeffrey P. Krall, Mitchell, SD (US); Vance Thompson, Sioux Falls, SD (US)

(73) Assignee: EYEBRAIN MEDICAL, INC., San Diego, CA (US)

( * ) Notice: Subject to any disclaimer, the term of this patent is extended or adjusted under 35 U.S.C. 154(b) by 0 days.

(21) Appl. No.: 14/013,338

(22) Filed: Aug. 29, 2013

(65) Prior Publication Data

US 2015/0049301 A1 Feb. 19, 2015

Related U.S. Application Data

(60) Provisional application No. 61/866,251, filed on Aug. 15, 2013.

(51) Int. Cl.
*G02C 7/02* (2006.01)
*G02C 7/06* (2006.01)

(52) U.S. Cl.
CPC .................................... *G02C 7/065* (2013.01)

(58) Field of Classification Search
CPC ........ G02C 7/061; G02C 7/063; G02C 7/065; G02C 7/066; G02C 7/068
USPC ............ 351/159.06, 159.42, 159.73, 159, 78
See application file for complete search history.

(56) References Cited

U.S. PATENT DOCUMENTS

| 4,222,639 | A | 9/1980 | Sheedy |
| 4,606,626 | A * | 8/1986 | Shinohara ................ 351/159.42 |
| 4,756,305 | A | 7/1988 | Mateik |
| 6,106,819 | A | 8/2000 | Sucher |
| 7,104,647 | B2 | 9/2006 | Krall |
| 7,828,439 | B2 | 11/2010 | Krall |
| 7,976,157 | B2 | 7/2011 | Croft |
| 8,042,940 | B2 | 10/2011 | Krall |
| 8,287,124 | B2 | 10/2012 | Krall |
| 2012/0019776 | A1* | 1/2012 | Giraudet ........................ 351/204 |
| 2012/0200822 | A1* | 8/2012 | Kaga et al. ............... 351/159.42 |
| 2012/0307203 | A1 | 12/2012 | Vendel |

OTHER PUBLICATIONS

Bifocals, Trifocals, and Progressive-Addition Lenses, Wisnicki M.D., American Academy of Ophthalmology, vol. XVII, No. 6, Jun. 1999.
Comparision of Fixation Disparities Obtained by Objective and Subjective Methods, Fogt et al., Vision Res., vol. 38, No. 3, pp. 411-421.

(Continued)

*Primary Examiner* — Scott J Sugarman
(74) *Attorney, Agent, or Firm* — Wood, Phillips, Katz, Clark & Mortimer

(57) ABSTRACT

The invention provides methods and lenses for reducing asthenopia related symptoms associated with proprioceptive disparity. In certain aspects, lenses of the invention include a distance portion and a near portion, and a progressive increase in minus power from the distance portion to the near portion. Additionally, lenses of the invention may include a prism and a progressive reduction in optical power, in which the prism and the progressive reduction are varied independently. In one embodiment, a lens is provided that has a base-in prism and that provides an increase in minus power from the distance vision portion of the lens to a near vision portion of the lens (i.e., a progressive reduction).

16 Claims, 6 Drawing Sheets

(56) References Cited

OTHER PUBLICATIONS

Parallel-Testing Infinity Balance. Instrument and Technique for the Parallel Testing of Binocular Vision, Shapiro, Optometry and Vision Science, vol. 72, No. 12, pp. 916-923 (1995).

Objective Measurement of Binocular Fixation Misalignment, Remole et al, Americal Journal of Optometry and Physiological Optics, vol. 63, No. 8, pp. 631-638 (1986).

Evans, Bruce JW. "Optometric prescribing for decompensated heterophoria." Optometry in Practice 9.2 (2008): 63.

* cited by examiner

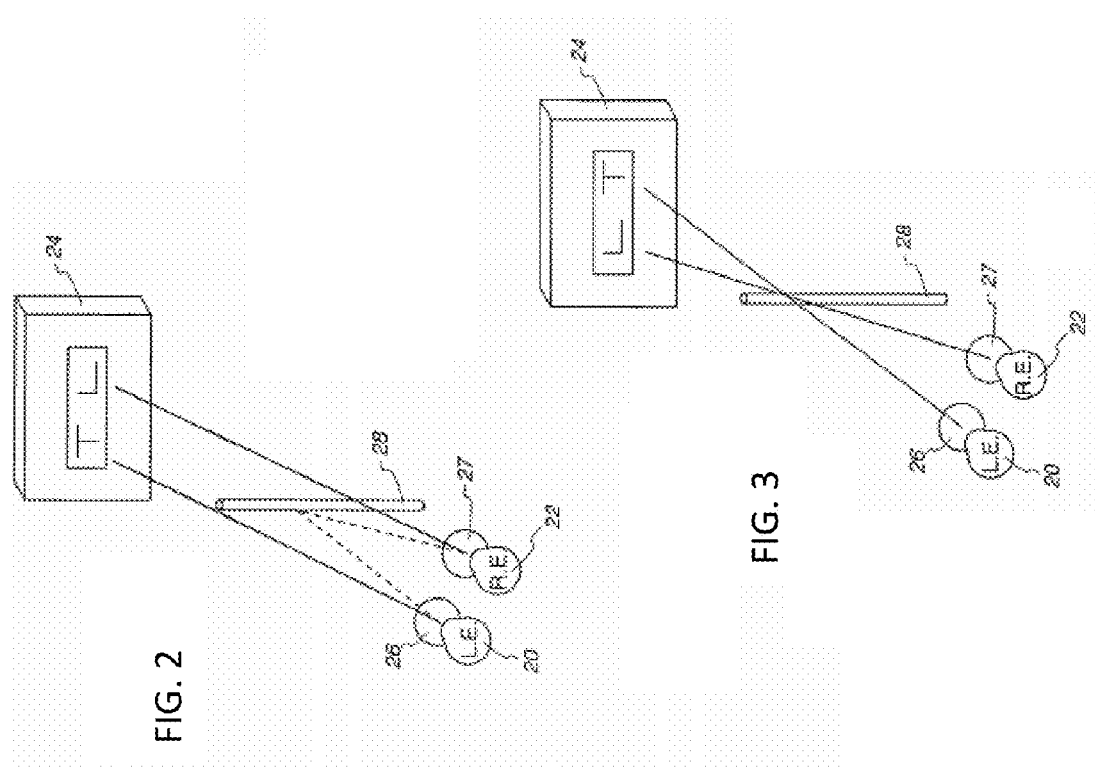

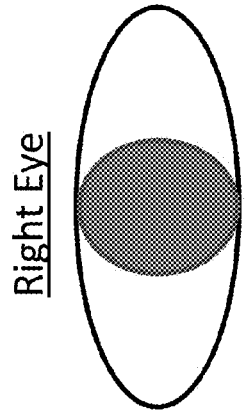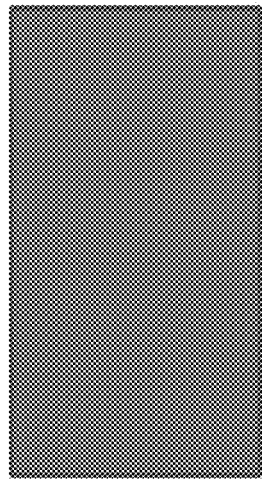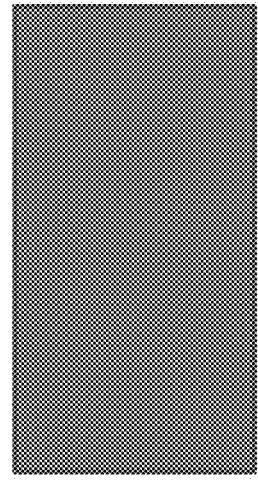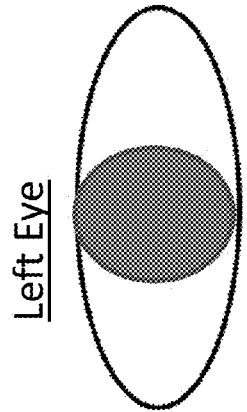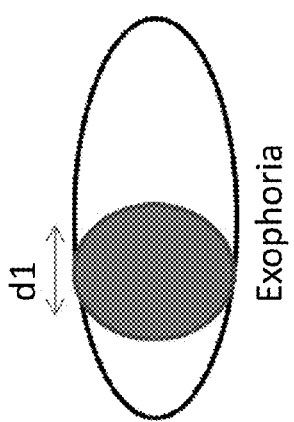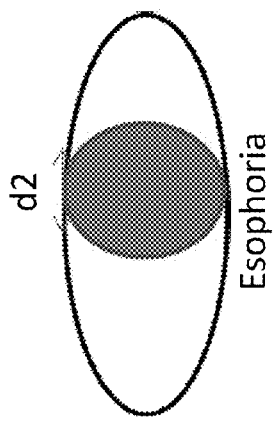
FIGS. 4-C

Accommodation: 1.5 Diopter

Accommodation: 2.5 Diopter

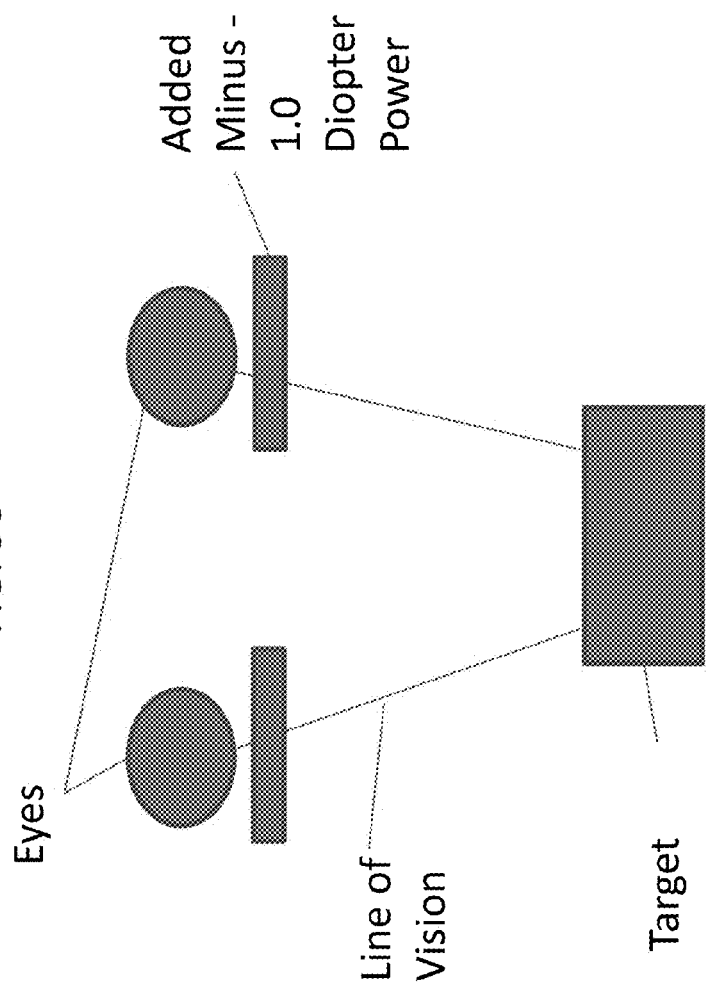

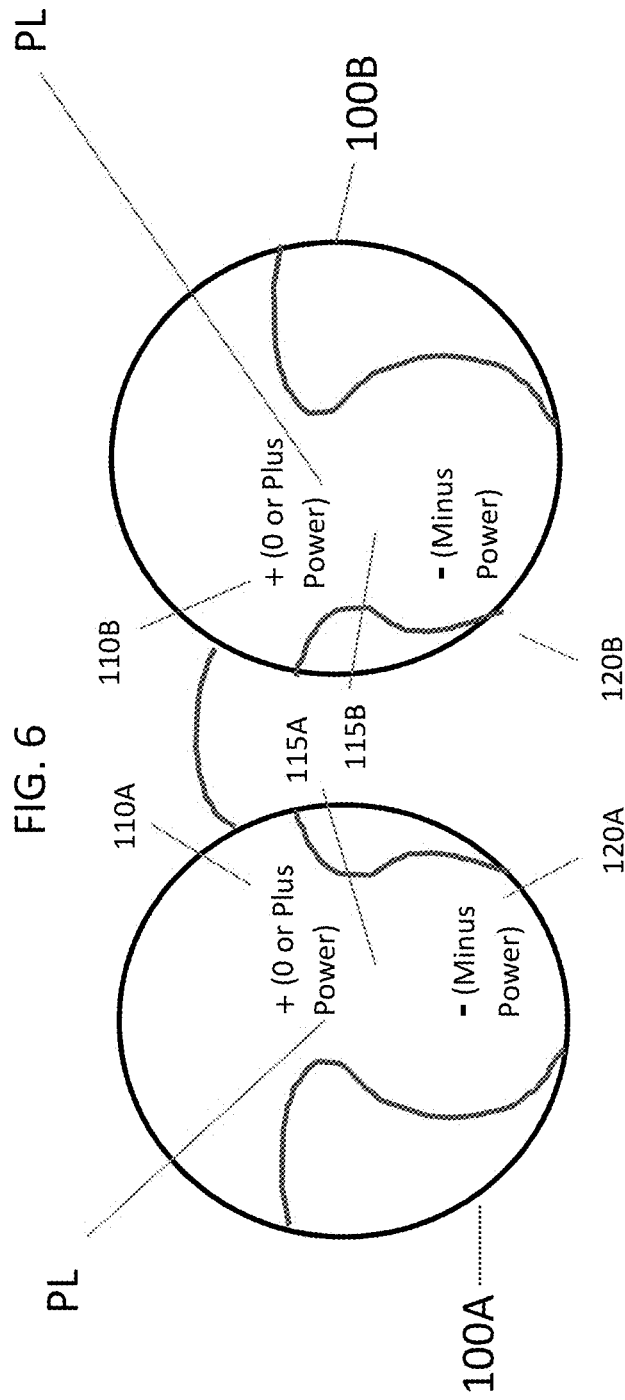
FIG. 6
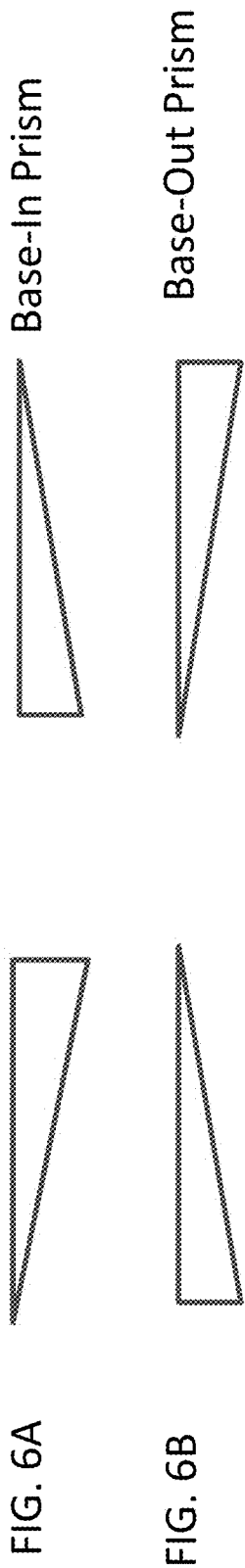
FIG. 6A
FIG. 6B

METHODS AND LENSES FOR ALLEVIATING ASTHENOPIA

RELATED APPLICATION

The present application claims the benefit of and priority to U.S. Provisional Application No. 61/866,251, filed Aug. 15, 2013. The entirety of which is incorporated by reference.

TECHNICAL FIELD

The present invention generally relates to lenses for reducing eye strain, headaches, and other asthenopia-related symptoms.

BACKGROUND

In normal binocular vision, an individual changes focus and alignment in order to maintain visual clarity whether an object is far away or in the near field. In order to maintain binocular fusion while focusing, several mechanisms must work in concert, including accommodation, the accommodation convergence mechanism, and the fusional vergence mechanism.

Accommodation is a process by which the eyes change their optical power to maintain a clear image on a target as its distance varies. Accommodation involves a coordinated change in lens shape, pupil size, in order to clear the image. The accommodative convergence mechanism is the associated positive (inward towards nose) and negative (outward away from nose) movement of the eyes during accommodation. The fusional vergence mechanism is the positive or negative movement of the eyes that compensates for a convergence deficiency (e.g. excess/deficit in accommodative convergence) in order to maintain binocular vision. Convergence disorders may be due to, for example, a phoria condition, fixation disparity, and/or proprioceptive disparity, also a muscular palsy, or neurological problem.

Proprioceptive disparity is an imbalance between where the eyes are consciously focused and the nonvisual perception of where the object is located in space—which often varies with distance.

When a proprioceptive disparity exists, the brain compensates in order to maintain a clear image. For some individuals, proprioceptive disparity often results in, for example, headaches, eye fatigue, pain around the eyes, blurred vision, neck pain, dry eyes, and other general symptoms of asthenopia.

Convergence disorders have been treated using prism lenses. Prisms cause the eyes to converge or diverge, and are added to a lens in order achieve a convergence balance between the eyes. However, the introduction of a prism alone does not alleviate asthenopia symptoms associated with proprioceptive disparity. For example, orthophoric patients with age related accommodation (e.g. normal accommodation and convergence) may still present with asthenopia due to proprioceptive disparity. Thus, prism lenses alone are not entirely effective and there have not been significant advances toward a more complete solution for problems such as proprioceptive disparity. Thus, there is a need in the art for more complete solutions to the proprioceptive disparity problem.

SUMMARY

The invention provides methods and devices for treating asthenopia and related conditions. The invention is based upon the recognition that proprioceptive disparity is reduced by use of a lens that has a progressive reduction in minus power from a distance portion of the lens to a near portion of the lens. The invention is based upon the recognition that the reversal of the power change progression in a traditional progressive lens (from a decrease in minus power to an increase in minus power) results in a reduction in the severity of asthenopia.

In another aspect, the invention comprises lenses having a combination of the appropriate variable prism and the appropriate progressive reduction in optical power, which may be varied independently. The synergy between the use of a prism, which may be a traditional prism, and the addition of minus power or progressive power reduction (as opposed to plus power or progressive power addition as is typically done to treat presbyopia) produces an unexpected enhancement in the treatment of proprioceptive disparity.

In a preferred embodiment, the invention provides a lens comprising a progressive increase in minus power from a distance portion to a near portion of the lens. In another embodiment, a lens is provided that has a base-in prism and that provides an increase in minus power from the distance vision portion of the lens to a near vision portion of the lens (i.e., a progressive reduction). The combination of base-in prism and progressive reduction, varied independently, reduces proprioceptive disparity and its sequelae, including headaches. The orientation and power of the prism is based upon the needs of the patient determined upon (ie., physical examination, and proprioceptive disparity). Thus, the prism may be a base-in prism, base-out, base-up, or base-down. Similarly, the progressive reduction portion of the lens is determined by the needs of the patient (i.e., the severity of the proprioceptive disparity). It is the unexpected synergy between a progressive reduction feature and the inclusion of an appropriate prism that results in a lens that has unexpected benefit in treating asthenopia, and headaches caused by proprioceptive disparity.

According to certain aspects, an amount of prism and an amount of progressive minus power incorporated into lenses of the invention is patient specific and varies independently. For example, the amount of prism and type of prism added to a lens can be an amount and type of prism required to correct a convergence deficiency in a particular individual. The convergence deficiency may be measured by a phoria present during monocular vision, a fixation disparity present during binocular vision, or combination thereof. In certain embodiments, the imbalance is determined using a proprioceptive disparity test. In addition, increasing minus power such that the increase is greater than one's visual correction simulates an individual's accommodation when viewing an object therefore changing the demand on the individual's convergence system. The minus power required to stimulate accommodation may be determined using an individual's accommodation/accommodative convergence ratio or proprioceptive ratio. This synergistic combination of prism and progressive minus power, determined independently, provides better relief of asthenopia and headaches in patients presenting with proprioceptive disparity than merely adding prism alone.

The invention also provides a diagnostic element that provides for determining whether a patient has proprioceptive disparity and prescribing an amount of prism and progressive reduction in optical power required to alleviate the proprioceptive disparity. Once a patient is diagnosed with proprioceptive disparity, an amount of prism in a lens required to alleviate proprioceptive disparity or a convergence deficiency associated with the proprioceptive disparity is determined and prescribed. Any techniques for determining an amount of prism to reduce proprioceptive disparity or convergence deficiency associated with proprioceptive disparity are suitable for use in the invention. In addition to an amount of prism, a progressive increase in minus power is prescribed to stimulate accommodation when an individual views near objects, thereby reducing demand placed on the individual's fusional vergence mechanism. According to certain embodiments, a patient's accommodation/accommodative convergence ratio is used to determine an amount of minus power for prescription. Any technique for determining an individual's accommodation/accommodative convergence ratio may be used.

Any technique for determining whether an individual has proprioceptive disparity can be used in accordance with methods of the invention. In certain embodiments, the level of proprioceptive disparity is determined by measuring the distance between where one is focusing at and the perceived location of the target.

The progressive reduction in optical power is an increase in minus power from a distance portion to a near portion of the lens. In addition, the increase in minus power may be added to the near portion using a bifocal or trifocal lens configuration. The distance portion of the lens may have a zero or plus dioptric power. The progressive increase in minus power may range anywhere between, for example, −0.01 to −4.00 diopters. In certain embodiments, the minus power progressively increases from −0.01 to −0.25, −0.25 to −0.75, −0.75 to −2.00, −2.00 to −3.00, and −3.00 to −4.00.

Lenses of the invention can be incorporated into eyeglasses using techniques known in the art. The prism and reduction in minus power in a right lens may be the same as or different from the prism and reduction in minus power in a left lens.

BRIEF DESCRIPTION OF THE DRAWINGS

FIG. 2 is a schematic representation of what an individual would see looking into the device of FIG. 1.

FIG. 3 is a schematic representation of what an individual will experience due to added Base Out Prism when the individual has proprioceptive disparity.

FIG. 4A illustrates an individual's eyes as they focus binocularly on a target.

FIG. 4B illustrates eye movement of an individual with an exophoria condition.

FIG. 4C illustrates eye movement of an individual with an esophoria condition.

FIGS. 5A through 5C illustrate various optical configurations and their effects on one's accommodation, accommodative convergence mechanism, and fusional vergence mechanism.

FIG. 6 exemplifies a pair of lenses according to certain embodiments.

FIG. 6A illustrates the addition of Base-In Prism.

FIG. 6B illustrates the addition of Base-Out Prism.

DETAILED DESCRIPTION

Figure 1:
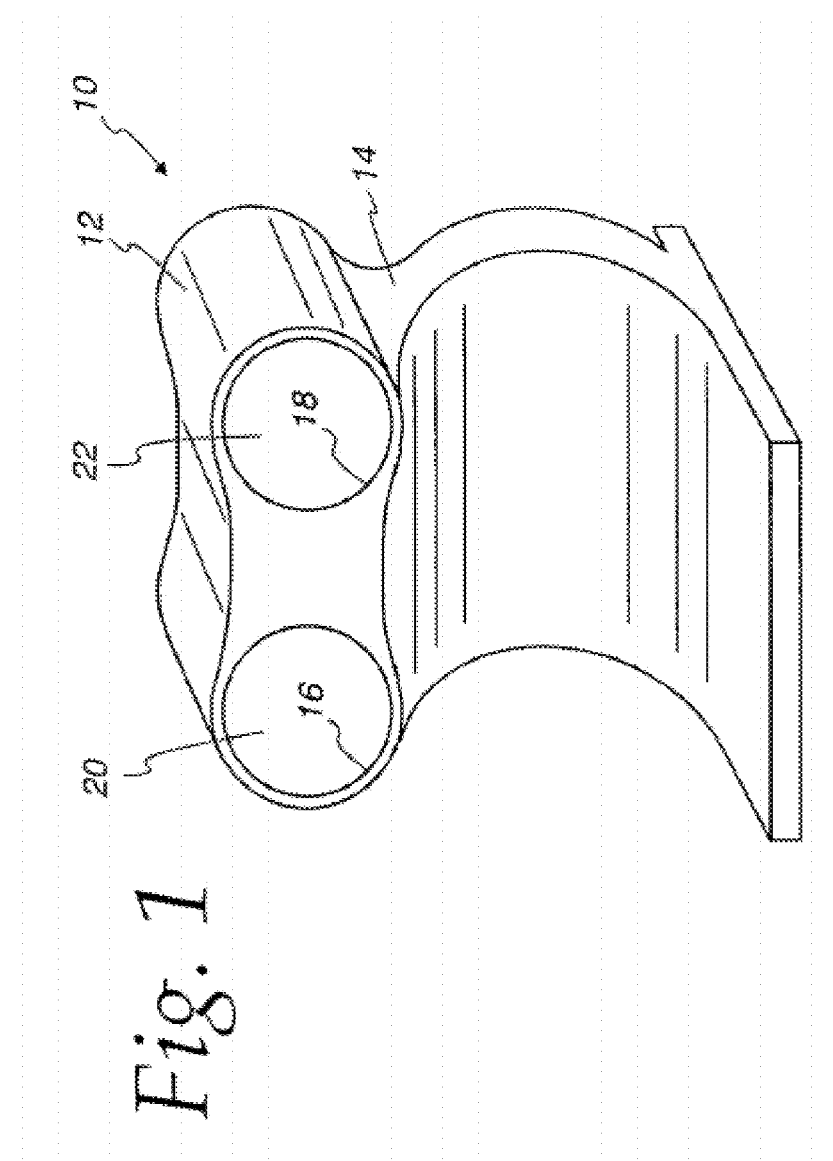
FIG. 1 depicts a device for determining a level of proprioceptive disparity.

The invention provides methods and devices for treating asthenopia. Lenses of the invention include a progressive reduction in optical power and, in certain aspects, a progressive prism. The progressive reduction in optical power and the progressive prism vary independently. The prism changes convergence of the individual, while progressive reduction in optical power stimulates accommodation and convergence reducing fusional vergence when viewing near objects. This synergistic combination of prism and the progressive reduction of optical power alleviate asthenopia-related symptoms associated with overuse of fusional vergence better than use of a prism alone.

In certain embodiments, methods of the invention alleviate asthenopia associated with proprioceptive disparity, fixation disparity, and/or a phoric condition. An individual presenting with proprioceptive disparity may have fixation disparity and/or a phoric condition.

Proprioceptive disparity is the difference between where an individual's eyes focus and where the eyes perceive they should be converging. For example, a computer user's brain focuses on his screen but his proprioceptive feedback mechanism has his eyes converged to a different location either in front or behind the screen. When an individual has proprioceptive disparity, the individual utilizes his/her fusional vergence, or divergence reserves to maintain alignment on the object. This constant adjustment to maintain alignment of the eyes on a target results in excessive stimulation of the nervous system, often resulting in asthenopia.

According to one embodiment of the invention, proprioceptive disparity is reduced by providing a lens that has an appropriate reduction in optical power, such as the addition of progressive minus power from the distance portion to the near portion of the lenses. According to another embodiment of the invention, proprioceptive disparity is reduced by providing of a lens that has a combination of an appropriate prism and an appropriate reduction in optical power. The amount of prism and type of prism added to a lens of the invention is based on a convergence or divergence need. The convergence deficiency can be measured using monocular tests, binocular test, or a combination monocular and binocular test that provide an amount of prism correction. The amount of minus power added to a lens can be determined using the individual's accommodation/accommodative convergence ratio, his accommodative reserve or demand, his working distance, a cross cylinder test, or a fixation disparity curve. However, any appropriate method for determining an individual's accommodation/accommodative convergence ratio or individual need may be used. In certain embodiments, the determination of an individual's accommodation/accommodative convergence ratio is measured while the individual's is wearing prism correction lenses. Alternatively, the determination of an individual's accommodation/accommodative convergence ratio is measured without prism corrective lenses.

The invention also provides a diagnostic element that includes determining whether an individual has proprioceptive disparity. If the patient has proprioceptive disparity, methods of the invention provide for prescribing a lens with a varied prism and a reduction in optical power, in which the prism and reduction in optical power are varied independently.

Lenses and methods of the invention for alleviating asthenopia are applicable to eye glass lenses, contact lenses, and surgical lens modification (e.g. Lasik surgery). Eye glasses typically include a frame with two lenses. One or both lenses within frames of the invention may include a prism, progressive reduction in optical power, or preferably both. The prism and progressive reduction in the right lens may be the same as or different than the prism and progressive reduction in the left lens.

According to certain aspects, lenses of the invention incorporate a prism. The prism may be selected from the group consisting of a Base-In, Base-Out, Base-up, Base-Down prism. A Base-In prism causes an eye to diverge outward. A Base-Out Prism causes the eyes to converge inward. Base-up and Base-down prisms are used when the eyes have a disparity in vertical orientation. The amount of prism and type of prism added to a lens of the invention can be an amount and type required to correct a convergence deficiency. In certain embodiments, an amount of prism and type of prism added to a lens of the invention is an amount of prism required to fix proprioceptive disparity. In addition, an amount of prism and type of prism added to a lens of the invention is an amount of prism required to resolve fixation disparity or a phoria condition (e.g. lateral and vertical phorias). As discussed, individuals with proprioceptive disparity may or may not also present with a fixation disparity and/or a phoria condition. Test for determining an amount and type of prism to be added to a lens are described in more detail hereinafter.

In addition to a prism, lenses of the invention include a reduction in optical power. The reduction in optical power is an increase in minus power from a distance portion of the lens to a near portion of the lens. In certain embodiments, the increase in minus power added to the lens can be determined based on the individual's accommodation/accommodative convergence ratio, which is described in more detail hereinafter. Alternative, the increase in minus power required to alleviate asthenopia symptoms can be determined by continually reducing the minus power over a period of time until asthenopia symptoms are reduced.

The reduction in optical power may be achieved in multi-focal lenses such as bifocal, trifocal, and progressive lenses. Bifocal lenses contain two different prescriptions in the same lens for near and distance viewing. Trifocal lenses contain three different prescriptions in the same lens for near, intermediate, and distance viewing. Progressive lenses include a gradual change in prescription power from distance to near viewing portions. Unlike conventional bifocal and trifocal lenses, progressive power lenses do not present any discernible dividing lines separating one portion from another on the surface of the lens. Preferably, lenses of the invention incorporate a progressive reduction in minus power.

Prior art multifocal addition lenses increase the plus power from the distance portion to the near portion. These prior art lenses are often designed to treat and compensate for presbyopia, which is an acute deterioration of near vision caused by loss of flexibility of the lens of the eyes as one ages. These prior art progressive add positive (+) power in order to assist an individual who has trouble seeing near objects. The distance portion allows the individual to focus clearly on objects far away and the near portion allows the individual to focus clearly on object near. The intermediate-vision portion comprises a "progressive zone" that defines a gradual transition in refractive power between the far-vision portion and the near-vision portion. That is, in the progressive zone, the refractive power exhibits a relatively gradual increase in plus power from the distance portion to the near portion.

In contrast to typical multifocal addition lenses, methods and lenses of the invention increase minus power from the distance portion to the negative portion in order to increase the demand on an individual's accommodation ability (and thus accommodative convergence). By increasing demand on an individual's accommodation ability, methods of the invention eliminate additional demand on the individual's convergence system inherent with viewing objects close up. Lenses of the invention can include the same configurations for different viewing area that are available for prior art progressive lenses (except the optical power is minus instead of plus). For example, lenses of the invention may include a distance-vision portion, an intermediate-vision portion (with the progressive zone) and a near-vision portion.

Any suitable test for determining whether an individual has proprioceptive disparity can be used in accordance with the invention. In one embodiment, a person is diagnosed with proprioceptive disparity based on symptoms. For example, a patient with proprioceptive disparity often exhibits dry eyes, gritty or sandy eye irritation, blurriness, and headaches after a certain period of time when focusing on a near object (e.g. reading, working on a computer). Symptomatic patients with proprioceptive disparity may experience these symptoms within about 30 minutes to 2 hours after the onset of work.

In addition to or as an alternative to symptomatic diagnosis, any diagnostic test or instrument configured to measure proprioceptive disparity may be used. For example, proprioceptive disparity may be measured by testing a patient's peripheral and central vision at the same time to determine the disparity between where the eyes converge based on perception and where the object is located. A preferred instrument for measuring proprioceptive disparity set forth in U.S. Pat. No. 7,828,439.

FIG. 1 is a conceptual view of an instrument 10 for measuring proprioceptive disparity set forth in the '439 patent. The apparatus 10 includes a housing 12 atop a stand 14. The housing includes openings 16 and 18 covered by lenses 20 and 22, respectively, for viewing by a user. The apparatus resembles conventional binoculars with a built-in stand. The device stimulates optical infinity in an individual while the individual views target letters and/or objects which may vary in size, shape and color. In addition, the device allows for peripheral fusion while central fusion is absent. The foveal targets are intended to be viewed separately by each eye. For example, the right eye can see the right central target and the left eye can see left central target, but the right central target cannot be seen by the left eye and the left central target cannot be seen by the right eye (lack of foveal binocularity). While there is a lack of central binocularity, the device provides for peripheral binocularity in which the borders and or outside targets (outside of the central vision) can be viewed by both right and left eyes at the same time. A multiple pinhole occluder can be alternated over one eye and then the other in order to cause a break in fusion. The use of the pinhole occluder will be to control the accommodative convergent response by decreasing the blur and the stimulation of accommodation and the accommodative convergence mechanism. This will allow for a more accurate measurement of the misalignment of the eyes.

FIGS. 2 and 3 illustrate an individual's view when looking into the instrument of FIG. 1. FIG. 2 illustrates how only the right eye (R.E) viewed through the lens 22 sees the letter L and the left eye (L.E.) viewed through the lens 20 sees the letter T, represented by solid lines. The dashed lines depict how the eyes are blocked from viewing opposite sides of the target 24. This is accomplished through either a mechanical or virtual septum 28 depicted half way between the lenses 20 and 22 and the target 24 which is perceptually viewed at infinity. FIG. 3 is a schematic representation, similar to FIG. 2, depicting what the viewer may experience when there is a proprioceptive misalignment or fixation disparity, where the objects L and T appear to switch sides. The solid lines show how the right eye now sees the letter L and the left eye sees the letter T. Using the adjustable prisms 26 and 27 of the instrument 10, Base Out Prism is added in a smooth and continuous manner until the images jump together; switch sides or suppression is noted, such as in FIG. 3. Then slowly a decrease in Base Out prism is started until Zero prism diopters are present and then continuing to add Base In prism at the same rate until the images return to their original positions, as in FIG. 2. When the targets are in positions which the subject perceives are back to the original starting position, that being the right eye sees the right target on the right side and the left eye sees the left target on the left side, and not superimposed upon each other, the amount of prism needed to achieve this is recorded.

According to certain embodiments, the amount of prism required to achieve effectively keep the images separate using the device and testing methods illustrated in FIGS. 2 and 3 is the prism added to a lens or lenses of the invention. Typically, the prism is Base-In prism, however it is understood that the individual may also require Base-Out, Base-Up, or Base-In prism to alleviate asthenopia associated with proprioceptive disparity.

The following is another method of determining a level of proprioceptive disparity using the instrument of FIG. 1. The periphery targets seen by both eyes may be varied by size, color and illumination. The central targets seen separately by each eye may be adjusted in size, color and the illumination. The objects viewed by each eye will be perceived to be at optical infinity. The objects to be viewed by each eye will be seen separately but also simultaneously. Base Out Prism is added in a smooth and continuous manner until the images jump together, switch sides or suppression is noted. Then slowly a decrease in Base Out prism is started until Zero prism diopters are added, then continuing to add Base In prism at the same rate until the images return to their original positions. When the targets in which the subject perceives are back to the original starting position that being the right eye sees the right target on the right side and the left eye sees the left target on the left side, and not superimposed upon each other, the amount of prism needed to achieve this is recorded. The goal is the minimal amount of Base In prism needed to effectively keep the images separate. In certain embodiments, the amount of Base-In prism needed to effectively keep the images is prescribed to the individual and incorporated into a lens or lenses of the invention.

In certain embodiments, proprioceptive disparity may be measured using the Opt-Align (Stereo Optical Co., Chicago) diagnostic instrument. The Opt-Align diagnostic instrument measures the proprioceptive disparity between eyes by isolating the relationship between saccadic eye movements, pursuits, and vergences. It works by alternating the central targets under monocular conditions with and without peripheral fusion while allowing for short periods of central binocular cortical fusion. Targets are alternated at the speed of one's saccadic eye movement while moving the targets at speeds slower than normal pursuits. With the Opt-Align device and testing method, both horizontal fixation disparity and vertical imbalances are measured. The amount of prism required to correct the fixation disparity and vertical imbalances can be prescribed to the individual and incorporated into a lens or lenses of the invention.

In other embodiments, proprioceptive disparity is measured using the Turville Infinity Balance Test (TIB) or the Modified TIB test. See Turville Infinity Balance (TIB) test: Morgan M W Jr. Am J Optom Arch Am Acad Optom. 1949 June; 26(6):231-9. The TIB technique allows an observer to see right eye and left eye images independently while both eyes are open, and to see peripheral images binocularly at the same time. The conventional method employed in the TIB test is to place a septum between two letters seen in the examining room mirror, so that each of these two letters is seen monocularly (the right eye does not see the image presented to the left eye, and vice versa). The observer then translates his or her gaze in the direction of greatest eye muscle imbalance, and may thus see that the image perceived by one eye becomes blurred. As an example, in a subject with a weak superior oblique muscle of the right eye the greatest eye muscle imbalance is in the direction in which said muscle has its greatest action, namely, lower left gaze. Thus, depending on which eye compensates for the imbalance, that eye will blur increasingly as the head is raised, turned and tilted to the right during the TIB test. In this example, then, the blur is greatest in the lower left direction of view. It is important to keep in mind that as the strain increases, the blur increases. To confirm that the blur occurs during the use of both eyes in their attempts to maintain binocular fusion, the non-blurred other eye is covered. When binocular vision is prevented, the strain in said one eye disappears and the letter displayed to said one eye is clearly seen. If the blur disappears, then it can be assumed that the stress in the extraocular muscles trying to maintain binocular fusion is eliminated. Using the TIB test one can determine the amount and type of prism required to correct convergence issues associated with fixation disparity. According to certain embodiments, the amount and type of prism recorded with a TIB or modified TIB is incorporated into a lens or lenses of the invention.

Patients with proprioceptive disparity typically exhibit a phoria condition. As such, lenses and methods of the invention according to certain embodiments provide for introducing an amount of prism and type of prism required to alleviate a phoria. Heterophoria is a type of eye condition in which the directions that the eyes are pointing are not consistent with each other. A person with two normal eyes has single vision (usually) because of the combined use of the sensory and motor systems. Heterophoria only occurs during dissociation of the left eye and right eye, when fusion of the eyes is absent. If you cover one eye (e.g. with your hand) you remove the sensory information about the eye's position in the orbit. Without this, there is no stimulus to binocular fusion, and the eye will move to a position of "rest". The difference between this position, and where it would be were the eye uncovered, is the phoria. Phorias may be caused by refractive errors, divergence insufficiency or excess, and convergence excess and insufficiency. Phorias can also be due to proprioceptive disparity (as discuss above) and nerve, muscle, congenital, or mechanical anomalies.

The effects of the proprioceptive disparity may be increased if the patient has a phoria condition. However, the extent of a phoria (or deviation) does not always correlate to the amount of symptoms associated with the proprioceptive disparity.

FIGS. 4A-4C illustrate different phoria conditions that are apparent using a cross-cover phoria test. A phoria test may be done at any distance, and when done inside a distance of 20 feet an orthophoric position would require that some convergence is taking place. This is normally done in primary gaze although could be measured when the point of fixation is located in any position of gaze. A phoria test views the phoria position of the eyes when all stimuli to fusion are eliminated. Fusion may be eliminated by simply occluding one eye, as done in the cross-cover test.

FIG. 4A illustrates an individual's eyes as they focus binocularly on a target. As shown in FIG. 4A, the eyes are substantially parallel when binocular fusion is present. If you canceled binocularity or fusion by interrupting the vision of one eye or the other, the lines of sight of the covered eye will go to a resting position. The measurement between the lines of sight when binocular vision is absent is known as a phoria position or the position of rest of the eye. This measurement with the amount and direction of the phoria is a measurement of the degree of discrepancy between the positions of binocularity and the position of rest assuming accommodation/convergence is not active. If the position of the eyes remain parallel under disassociation (e.g. do not move from the position shown in FIG. 4A), then the phoria is known as orthophoria, which is the normal equilibrium position of the eyes.

Orthophoria does not indicate parallelism but refers to both lines of site directed towards the target of fixation when fusion is interrupted.

If the position of the eyes changes under dissociation, the individual has a misalignment of the eyes, which is a condition known as a heterophoria. This indicates that the eyes are not relaxed when viewing a target binocularly. FIGS. 4B and 4C illustrate a change in the position of the eye under disassociation (i.e. break in binocular fusion). As shown in FIG. 4B, when the right eye is covered, the left eye diverges a distance d1 from the position of the left eye in FIG. 4A. This divergence is known as exophoria. As shown in FIG. 4C, when the right eye is covered, the left eye converges a distance d2 from the position of the left eye in FIG. 4A. This divergence is known as esophoria.

The phorias shown in FIGS. 4B and 4C are considered latent deviations. This is because the fusional vergence mechanism compensates for the phoria. That is, the fusional vergence system provides the additional convergence and divergence required caused by the phoria in order to maintain binocularity.

Phorias can be defined by the amount of prism (Δ) required to compensate for the convergence or divergence. For example, the total amount of convergence required to view an object 40 cm away is 15Δ. If a person is orthophoric, the person's accommodative convergence mechanism will account for the 15Δ convergence required to view the object binocularly. If the person has 5Δ exophoria, then the person's fusional vergence mechanism will supply the additional 5Δ convergence to maintain binocular vision.

Figure 5B:
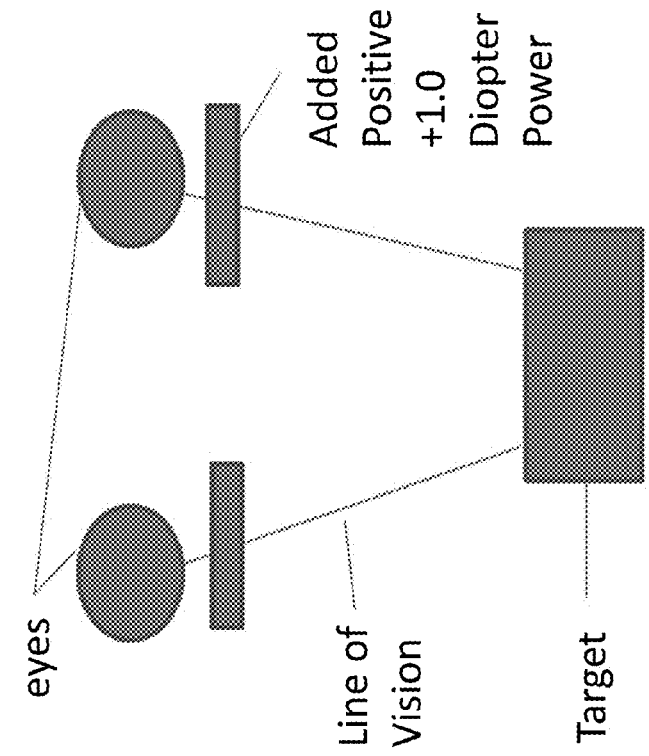
Figure 5A:
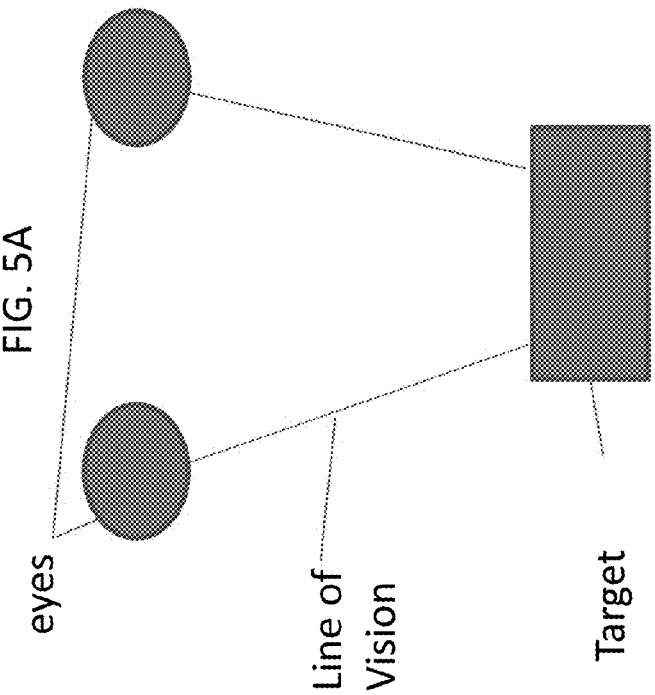

In addition, phoria conditions can be induced with the addition of positive or negative optical power lenses due to their effect on one's accommodation, accommodative convergence mechanism, and fusional vergence mechanism. FIGS. 5A through 5C illustrate various optical configurations and their effects on one's accommodation, accommodative convergence mechanism, and fusional vergence mechanism. FIG. 5A shows the line of vision of an individual viewing a target about 40 cm away without optical lenses. For binocular vision, the calculated accommodation required for an individual to view the target 40 cm away is 2.5 diopters. An individual who is orthophoric at this distance is able to view the target binocularly without demand on the fusional vergence system.

FIG. 5B illustrates the addition of +1.00 positive power in front of the same individual while focusing on the target 40 cm away. In order to maintain the same line of vision in FIG. 5B as in FIG. 5A, the individual must rely on positive fusional vergence in order to maintain the convergence to the target. This is because the increase in positive diopter power (+1.00) causes the stimulus to accommodation to decrease from 2.5 to 1.5 diopters. As accommodation relaxes, so does the accommodative convergence mechanism. As a result, the visual axes should diverge relative to the point of fixation, which would bring about diplopia (or double vision). Instead of diverging, positive fusional vergence is used to properly align the eyes to the point of fixation in order to avoid diplopia.

FIG. 5C illustrates the addition of −1.00 negative power in front of the same individual while focusing on the target 40 cm away. The addition of negative power increases the demand on accommodation to +3.50, thereby also increasing the demand on accommodative convergence. As a result, the visual axes should converge relative to the point of fixation, which would bring about diplopia (or double vision). In order to maintain the same line of vision in FIG. 5C as in FIG. 5A, the individual must rely on negative fusional vergence mechanism in order to maintain the convergence to the target.

The degree of a phoria can be determined using methods known in the art. Common methods for determining the degree of phoria upon dissociation include, for example, the cross-cover test, prism dissociation test, and the Maddox rod test. The Maddox Rod test places a Maddox rod in front of an individual's eye, and bar or loose prisms are used to quantitate a horizontal or vertical deviation. This test is described in more detail in Hansen, Jrn'l of Opth. Med. Tech., Vol. 2, Number 2, June 2006. The degree of phoria at optical infinity or near vision distance can be used to determine the amount accommodative convergence induced by accommodation (e.g. the accommodative convergence/accommodation ratio AC/A).

In certain embodiments, the accommodative convergence/accommodation ratio (AC/A ratio) is used use to determine the reduction of minus power required to alleviate proprioceptive disparity. The AC/A ratio is the amount of accommodative convergence measured in prism diopters induced by each diopter of accommodation. The AC/A ratio can be measured using any technique known in the art. For example, the AC/A ratio can be measured using the heterophoria method or the gradient method. The heterophoria method involves measuring the deviation in distance fixation at optical infinity with full correction of any refractive error, assuming no accommodation is exerted. The deviation is also measured at near vision distance, assuming that the convergence is caused by the accommodative convergence mechanism. The AC/A ratio is obtained from the equation $$AC/A = PD + \frac{\Delta_n - \Delta_d}{D},$$

where PD is the interpupillary distance (in centimeters), $\Delta_n$ and $\Delta_d$ the deviations near and at distance, and D the fixation distance at near in diopters (which is typically 33 cm or 3D, as 100/33=3D).

Knowing the amount of accommodative convergence caused by an amount of accommodation, one can determine the additional amount of accommodative stimulus (increase in minus optical power) to alleviate the inherent demand on an individual's convergence system when the individual focuses on a near object. In other words, one can determine a degree to which added minus power would decrease demand in an individual's fusional vergence mechanism by stimulating accommodation (e.g causing over-accommodation). The hypothetical example hereinafter illustrates using the accommodation/accommodative convergence ratio to determine a level of minus power for reducing demand on one's fusional vergence mechanism.

In addition, the amount of minus power added to lenses of the invention may be increased based on an individual's response to the added minus power. For example, a small range of minus power may be initially added, which may be increased overtime until the individual's asthenopia related symptoms are relieved.

Devices of the invention include a lens or pair of lenses (which may be incorporated into eye glass frames) that incorporate a prism and an increase minus optical power configured to reduce demand on one's fusional vergence system as discussed above. Lenses of the invention with an increase in minus power from a distance portion to a near portion of the lens may be prepared using known methods for construction progressive, bifocal, or trifocal lenses. Typically, progressive lenses are made with an increase in plus power from the distance portion to a near portion in order to compensate for presbyopia or problems associated with seeing clearly up close. In contrast, progressive lenses of the application provide an increase in minus power from a distance portion to a near portion. It is understood that the same concepts of construction for progressive lenses with added plus power may be applied to progressive lenses with added minus power.

FIG. 6 exemplifies a pair of lenses according to certain embodiments. As shown in FIG. 3, lenses 100A, 100B have an increase in minus optical power from a distance portion 110A, 110B to a near portion 120A, 120B of the lenses 100A, 100B. Although both of the lenses 100A, 100B are shown with an added minus power that increases from a distance portion 110A, 110B to a near portion 120A, 120B, it is understood that either lens 100A, 100B alone may have added minus optical power that increases from a distance portion to a near portion, and that the lenses 100A, 100B may have the same or different optical power.

Referring back to FIG. 6, each lens 100A, 100B at the location PL in the distance portion 110A, 110B has either 0 or positive optical power. In the near portion 120A, 120B, the lens has an added minus power configured to reduce demand one's fusional vergence mechanism. In certain embodiments, the optical power from the distance portion 110A, 110B may gradually/progressively increase in minus power. For progressive lenses and as shown, the lenses 100A, 100B include an intermediate section 115A, 115B. The intermediate section 115A, 115B comprises a "progressive zone" that defines a gradual transition in optical power between the far-vision portion 110A, 110B and the near-vision portion 120A, 120B. The gradual increase may correspond to a level of optical power required to stimulate accommodation at particular viewing distances, e.g. 20 ft, 15 ft, 10 ft, 5, ft, 3 ft, 100 cm, 75 cm, 40 cm, 35 cm, 30 cm, 25 cm, 20 cm, 15 cm, 10 cm, etc.

The minus (−) power may increase from the distance portion to the near portion in the range of −0.01 to −4.00 diopters. The optical power at the distance portion may be minus, zero or plus power. The following are exemplary ranges for a progressive increase in minus (−) power: about −0.01 to about −0.25 diopters; about −0.25 to about −0.75 diopters; about −0.75 to about −1.25 diopters; about −1.25 to about −2.00 diopters; about −2.00 to about −3.00 diopters; about −3.00 to −4.00 diopters.

FIGS. 6A and 6B illustrate the prism power that can be added to either lens 100A, 100B depicted in FIG. 6. FIG. 6A depicts the addition of Base-In prism. FIG. 6B depicts the addition of Base-Out prism. The prism added to lenses 100A, 100B can be the same or different. In addition to Base-In and Base-Out prism, lenses of the invention can incorporate progressive Base-Up and Base Down prism. The addition of prisms into lenses is known in the art.

In certain embodiments, the amount of prism can vary from the distance portion to the near portion of the lenses. For example, prism can be added compensate for prism inherently added as the lenses increases in minus power from the distance portion of the lenses to the near portion of the lens.

Lenses required for the addition of plus and minus power are known in the art. Plus lenses are configured to condense light and are typically concave. Minus lenses are configured to diverge light and are typically convex. Corrective lenses are typically, spherical, cylindrical or aspherical. The strength of the lenses is determined by the material of the lenses and the curvature of the front and back surface. Strength measures the extent to which light is bent as it passes through the lens (expressed in diopters).

In certain embodiments, prism (e.g. base prism) may be added along with the progressive prism with increasing optical power. The addition of a base prism changes the relationship of where the eyes converge in relation to where the eyes are focused. The added base prism may include Base In prism, Base Out prism, Base Up prism, and/or Base Down prism. The base prism may be induced in varying amounts and progress with the increase of optical power (e.g. minus power), so that as the optical power increases, the base prism likewise increase.

Habitually, progressive multifocal lenses have an aspherical or complex surface. The term aspherical surface should be taken to mean a surface that departs from the shape of a portion of a sphere. As is well known, such a complex surface is usually defined by the altitude of every point thereon. Use is also made of parameters established by the minimum and maximum curvatures at each point, or more commonly their half-sum and difference. This half-sum and the absolute value of the difference multiplied by a factor n−1, n being the refractive index of the material of the lens, are called mean sphere and cylinder.

Progressive lenses of the invention can either be hard deign or soft design. Hard design progressive lenses have a short progression from the distance portion to the near portion and a hard periphery. Hard design progressive lenses have larger distance and near portions as compared to soft lenses. Soft lenses have a wider and longer progressive area than hard lenses.

Lenses of the invention may be formed from any suitable material. A lens material chosen may be based on an index of refraction. Lens materials have different indexes of refraction and different effects on light rays entering the lens at the critical angle. The higher the index of refraction, the thinner the lens and the greater angle of refraction. For example, lenses may be constructed from glass, Crown glass (1.52), Hilite glass (refractive index around 1.80), standard plastic (refractive index range −1.48≤nd<1.54; such as CR-39), mid-index plastic (refractive index range: −1.54≤nd<1.60), polycarbonate (refractive index around +/−1.5 to ⅙), high index plastic (refractive index range: −1.60≤nd<1.74), and very high index range (refractive index −1.76≤nd).

Lenses of the invention may include one or more surface treatments to improve the quality of the lenses. A progressive ophthalmic lens element according to an embodiment of the present invention may be formulated from any suitable material. In one embodiment a polymeric material may be used. The polymeric material may be of any suitable type, for example, it may include a thermoplastic or thermoset material. A material of the diallyl glycol carbonate type, for example CR-39 (PPG Industries) may be used. The polymeric article may be formed from cross-linkable polymeric casting compositions. The polymeric material may include a dye, preferably a photochromic dye, which may, for example, be added to the monomer formulation used to produce the polymeric material.

A progressive ophthalmic lens element according to an embodiment of the present invention may further include standard additional coatings to the front or back surface, including electrochromic coatings. The front lens surface may include an anti-reflective (AR) coating, for example of the type described in, for example, U.S. Pat. No. 5,704,692. The front lens surface may include an abrasion resistant coating, for example, of the type described in U.S. Pat. No. 4,954,591.

Lenses of the invention may be constructed out of a photochromic material according to certain embodiments, Photochromic lenses are made of materials that change color and transmission qualities based on an amount of ambient light.

Hypothetical Example for Determining an Amount of Progressive Reduction in Optical Power:

In this example, it is assumed that a 25-year-old patient has normal accommodation and convergence and has a plano correction at distance in both eyes. The patient has been experiencing symptoms of asthenopia and has been diagnosed with proprioceptive disparity.

When this person is looking at optical infinity there is no stimulation to the accommodative convergence mechanism. If he starts to change his viewing distance from infinity to near and focuses at a target approximately 16 inches away he will need approximately 2.5 diopters of accommodation to see the target clearly. If this particular person has an accommodative convergence ratio of 4/1 he will be converging 4 diopters for every one diopter he is focusing. Therefore 2.5 diopters of focus ×4=10.00 diopters of convergence.

If there is an increase the minus power of −1.00 diopters when viewing the target at 16 inches the resultant increase in convergence will be 4 diopters. Based on the accommodation/accommodative convergence ratio, the individual accommodates 3.5 diopters, which results in 14.0 diopters of accommodative convergence. Thus, reducing any demand on the fusional vergence reserves by 4 diopters when viewing the target at 16 inches away.

By increasing the demand on the accommodative convergence, methods of the invention are able to reduce additional demand on the fusional vergence associated with proprioceptive disparity. In return, asthenopia symptoms caused by the proprioceptive disparity are likewise reduced.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein.

What is claimed is:

1. A progressive lens for reducing proprioceptive disparity, the lens comprising a distance portion and a near portion and a progressive increase in minus power from the distance portion to a near portion of the lens.

2. The lens of claim 1, further comprising a progressive prism.

3. The lens of claim 2, wherein the prism is selected from the group consisting of a base-in prism, a base-out prism, a base-up prism, and a base-down prism.

4. The lens of claim 1, wherein the distance zone comprises a zero, minus, or plus dioptric power.

5. The lens of claim 1, wherein the increase in minus power ranges from about 0 to about −4.00 diopters.

6. The lens of claim 5, wherein the increase in minus power ranges from about −0.01 to about −0.25 diopters.

7. The lens of claim 5, wherein the increase in minus power ranges from about −0.25 to about −0.75 diopters.

8. The lens of claim 5, wherein the increase in minus power ranges from about −0.75 to about −1.75.

9. The lens of claim 5, wherein the increase in minus power ranges from about −1.75 to about −2.00 diopters.

10. The lens of claim 5, wherein the increase in minus power ranges from −2.00 to about −3.00 diopters.

11. The lens of claim 5, wherein the increase in minus power ranges from −2.00 to about −4.00 diopters.

12. A method for reducing proprioceptive disparity, the method comprising
providing a lens with a progressive increase in minus power from a distance portion to a near portion of the lens.

13. The method of claim 12, wherein said lens further comprises a prism.

14. The method of claim 13, wherein the power of the progressive increase in minus power from said distance portion to said near portion and the power of the prism vary independently.

15. The method of claim 13, wherein the prism is selected from the group consisting of a base-in prism, a base-out prism, a base-up prism, and a base-down prism.

16. The method of claim 12, wherein the distance portion comprises a minus, zero or plus dioptric power.

* * * * *